US012579857B2

(12) United States Patent
Hauri

(10) Patent No.: US 12,579,857 B2
(45) Date of Patent: Mar. 17, 2026

(54) METHOD FOR OPERATING A PERSON SEPARATION DEVICE AS WELL AS PERSON SEPARATION DEVICE

(71) Applicant: Assa Abloy Entrance Systems AB, Landskrona (SE)

(72) Inventor: Marco Hauri, Galgenen (CH)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

(21) Appl. No.: 18/687,954

(22) PCT Filed: Aug. 3, 2022

(86) PCT No.: PCT/EP2022/071871
§ 371 (c)(1),
(2) Date: Feb. 29, 2024

(87) PCT Pub. No.: WO2023/030816
PCT Pub. Date: Mar. 9, 2023

(65) Prior Publication Data

US 2024/0371222 A1 Nov. 7, 2024

(30) Foreign Application Priority Data

Aug. 31, 2021 (SE) .................................... 2130232-8

(51) Int. Cl.
*G07C 9/15* (2020.01)
*E01F 13/04* (2006.01)

(52) U.S. Cl.
CPC .............. *G07C 9/15* (2020.01); *E01F 13/048* (2013.01)

(58) Field of Classification Search
None
See application file for complete search history.

(56) References Cited

U.S. PATENT DOCUMENTS 10,282,720 B1 5/2019 Buibas
2002/0067259 A1 6/2002 Fufidio
(Continued)

FOREIGN PATENT DOCUMENTS

WO 2011128408 10/2011
WO WO2011128408 A1 * 10/2011 ............... G06K 9/00
(Continued)

OTHER PUBLICATIONS

International Search Report and Written Opinion for PCT/EP2022/074181, completed Nov. 3, 2022.
Swedish Office Action for 2130232-8, dated Aug. 31, 2021.

*Primary Examiner* — Leon Viet Q Nguyen
(74) *Attorney, Agent, or Firm* — Wissing Miller LLP

(57) ABSTRACT

A method for operating a person separation device (10) with a door (18) is provided which comprises the following steps: —capturing a recording by a camera (26) wherein at least one person (P) is present in the recording—receiving from the clearing system (12), the result of a clearing process of the at least one person (P), —setting a clearing status of the at least one person (P) based on the result of the clearing process, —tracking the movement of the at least one person (P) in the recording, —controlling the door (18) based on the movement of the at least one person and the clearing status. Further, a person separation device (10) is shown.

19 Claims, 5 Drawing Sheets

(56) References Cited

U.S. PATENT DOCUMENTS

| | | | | |
|---|---|---|---|---|
| 2004/0017929 | A1 | 1/2004 | Bramblet | |
| 2009/0167857 | A1 | 7/2009 | Matsuda | |
| 2013/0201286 | A1 * | 8/2013 | Schockmel | G08C 19/00 348/46 |
| 2018/0137629 | A1 * | 5/2018 | Mishma | G06T 7/248 |
| 2019/0360256 | A1 * | 11/2019 | Sasaki | E05F 15/73 |
| 2021/0224552 | A1 | 7/2021 | Smith et al. | |
| 2022/0027648 | A1 * | 1/2022 | Trundle | G07C 9/00563 |

FOREIGN PATENT DOCUMENTS

| | | | | |
|---|---|---|---|---|
| WO | WO2020240602 | A1 * | 3/2020 | G07C 9/00 |
| WO | 2020240602 | | 12/2020 | |

* cited by examiner

Fig. 9a)
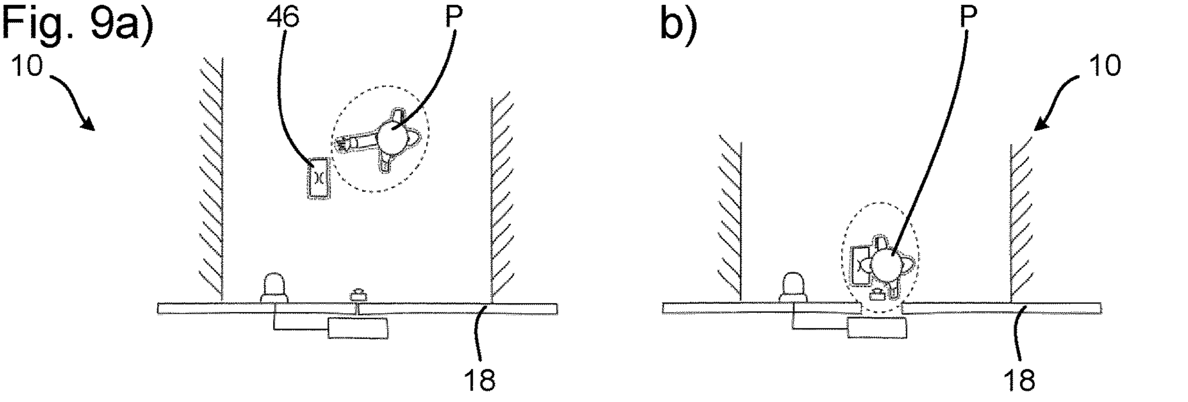
b)
Fig. 10
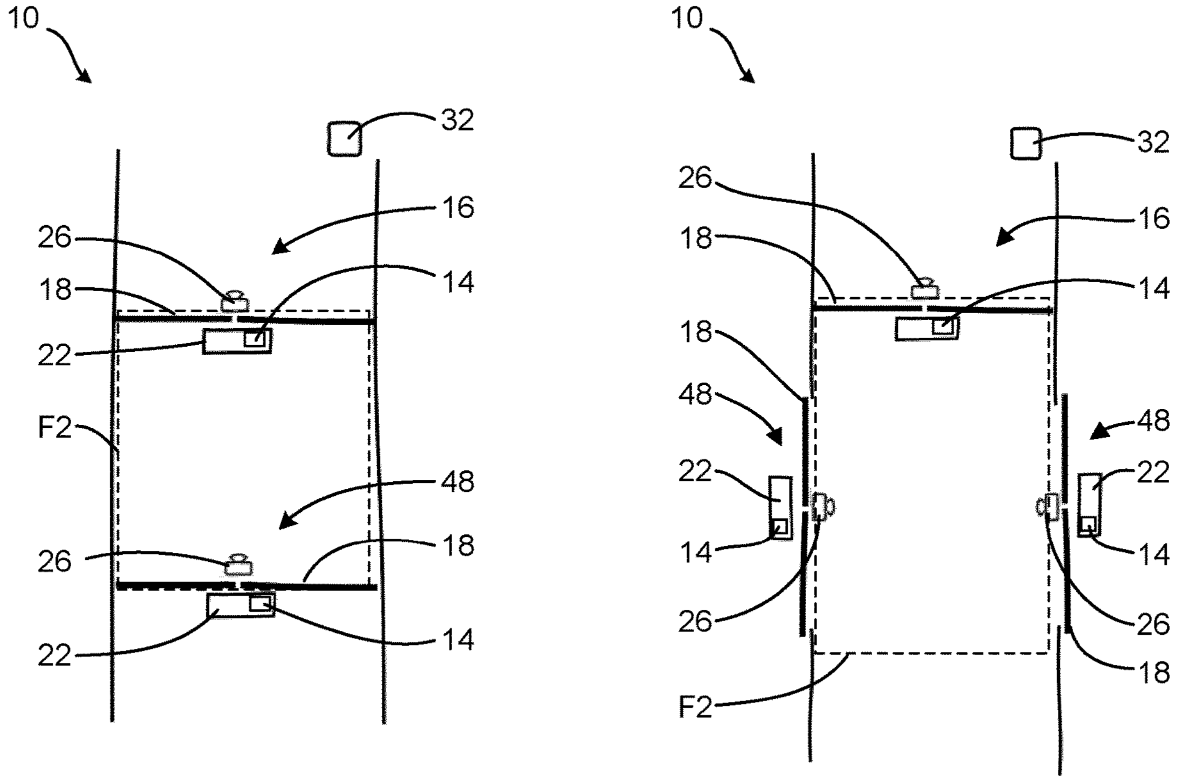
Fig. 11

METHOD FOR OPERATING A PERSON SEPARATION DEVICE AS WELL AS PERSON SEPARATION DEVICE

This application is a 371 of PCT/EP2022/071871, filed on Aug. 3, 2022, published on Mar. 9, 2023, under publication number WO 2023/030816, which claims priority benefits from Swedish Patent Application No. 2130232-8, filed on Aug. 31, 2021, the disclosure of each of which are incorporated herein by reference.

The invention relates to a method for operating a person separation device as well as a person separation device having an automatic door system.

BACKGROUND OF INVENTION

Person separation devices are known in the art, for example in entrance areas of buildings. Usually, person separation devices rely on separation structures, like turnstiles or speed-gates, that are installed in addition to doors in order to achieve the desired separation.

Systems relying on doors for people separation are so far very unreliable as persons cannot be singled out if other persons are present in front of the door.

Thus, it is the object of the invention to provide a method for operating a person separation device as well as a person separation device that work reliably and do not need separation structures but rely on doors for the separation of persons.

SUMMARY OF THE INVENTION

For this purpose, a method for operating a person separation device comprising a clearing system with at least one clearing area, a tracking unit and at least one automatic door system is provided. The automatic door system comprises a door, at least one drive unit for actuating the door, a camera and a control unit for controlling the drive unit, wherein the field of view of the camera includes the clearing area. The method comprises the following steps:

- capturing a recording by the camera and transmitting the recording to the tracking unit, wherein at least one person is present in the recording,
- receiving, by the tracking unit from the clearing system, the result of a clearing process of the at least one person in the clearing area,
- setting a clearing status of the at least one person based on the result of the clearing process of the respective at least one person by the tracking unit,
- tracking the movement of the at least one person in the recording after the clearing process by the tracking unit, and
- controlling the drive unit based on the movement of the at least one person and the clearing status.

By recording a clearing area, determining a clearing status for a person in the recoding and tracking the movement of persons from the clearing area to the door, the operation of the door can be controlled very precisely and for individual persons. Therefore, the door may be operated very reliably such that only persons which are allowed to pass the door can actually pass through the door.

In particular, these persons are not obstructed by the door, for example they do not have to change their pace or direction.

The recording includes for example at least parts of the track of the door and/or the area between the at least one terminal and the door.

The recording may be a recording of a series of consecutive images and/or a video recording.

The drive units are, in particular, controlled such that the door is opened for the at least one person if its clearing status indicates that the at least one person is allowed to pass the door.

The door may be a swing door, a revolving door, a sliding door, a folding door or the like.

For example, the camera is an integral part of the safety functionality of the door and monitors e.g. the track of the door, particularly of the door leaf.

In particular, the camera is mounted above the door.

The tracking unit may be part of the door system, in particular a part of the control unit, or the tracking unit may be separate from the door system, for example provided as a cloud server.

For example, the tracking unit recognizes, tracks and sets the clearing status for more than one person present in the recording, in particular such that each person in the recording has an individual clearing status and its movement is tracked separately.

The clearing system may comprise more than one terminal.

In an aspect, the clearing status of a person in the recording is positive if the tracking unit has received a positive result of the clearing process of the respective person and, optionally, if at least one clearing condition has been met; and/or the clearing status of a person in the recording is negative if the tracking unit has not received a positive result of the clearing process of the respective person or, optionally, if at least one clearing condition has not been met. This way, precise clearing statuses can be allocated.

In an embodiment, the clearing process includes detecting a clearing action performed by the at least one person in the clearing area, and evaluating the performed clearing action by the clearing system, wherein the result of the clearing process is positive if the clearing action conforms to at least one predetermined criterion. By relying on the result of a clearing system, precise information is used to determine whether or not a person may pass the door. Making use of clearing conditions, the reliability of the method can be improved further.

In order to provide good usability for the persons, the clearing system may comprise at least one terminal located in the clearing area, wherein the clearing action is performed on the terminal.

In an embodiment, the terminal is an authentication terminal and/or a payment device, wherein the clearing action is an authentication action and/or a payment, wherein the predetermined criterion for the clearing action is met if the clearing action has led to a successful authentication and/or authorization of the at least one person and/or if the payment has been completed successfully. This way, authentication and/or payment processes may be handled automatically.

The terminal may also be a hygiene device and the clearing action the use of the hygiene device.

In another aspect of the invention, the tracking unit receives information about at least one property of the person from the clearing system, in particular the terminal, and determines the same at least one property of the person in the recording, wherein the clearing condition is met, if the at least one property received from the clearing system and the at least one determined property match. By providing a check of the property of the person, the accuracy of the tracking system is improved.

The at least one property may be the age, the gender, the height, and/or body movement patterns of the respective person.

For example, the drive unit is controlled to open the door for a specific person if the specific person approaches the door, the clearing status of the specific person is positive and, optionally, at least one security condition is met, and/or the door is kept close or the drive unit is controlled to close the door if the specific person approaches the door but the clearing status of the specific person is negative and/or, optionally, at least one security condition is not met. This way, the access of persons to areas behind the door is controlled reliably. Using security conditions, the reliability of the separation of person can be improved even further.

In an aspect, the at least one security condition comprises the integrity of a door-related security zone, the door-related security zone being a predefined area in the recording, wherein the shape and/or size of the door-related security zone depends on kinematic properties of an uncleared person, in particular the walking speed, the walking direction and the distance to the door, wherein the security condition regarding the integrity of the door-related security zone is met if no uncleared person is within the door-related security zone. Thus, access to areas behind the door by persons loitering in front of the door is prevented.

The door-related security zone corresponds, for example, to an area in front of and/or adjoining the door, in particular in front of the opened passage. For example, if an uncleared person is within the door-related security zone, also partially, the respective security condition is not met.

In another aspect, the at least one security condition comprises the integrity of a dynamic, personal security zone around the specific person, the personal security zone being an area with predefined or dynamic shape and size in the recording around the specific person, wherein the security condition regarding the integrity of the dynamic security zone is met if no uncleared person is within the dynamic security zone. Using the dynamic security zone, an intruder may not gain access through the door by trailing or piggybacking a cleared person.

The dynamic security zone corresponds in particular to an area around the specific person. For example, if an uncleared person is within the door-related security zone, also partially, the respective security condition is not met.

To reduce the number of situations in which the door is kept close without actual reason, the shape and/or size of the door-related security zone and/or the shape and/or size of the dynamic security zone may be chosen such that the door can safely be closed between a cleared person passing the door and an uncleared person trailing the cleared person, and/or the size of the door-related security zone and/or the size of the dynamic security zone depend on the current width of the opened passage of the door.

In an embodiment, the at least one security condition comprises the permissibility of a fusion of the specific person with a previous isolated object, in particular wherein a fusion of a person with a previously isolated inanimate object is permissible. This way, inanimate objects may be considered in the decision to open the door and reacted upon. This security condition is also met if no fusion has taken place.

Within this disclosure, fusion is the process when two objects and/or person that have been previously discernable in the recording come close to one another to that they are no longer discernable from one another and have to be treated as a single object or person by the camera and/or the tracking unit due to the specific view of the camera on the scenery.

The isolated object may be a bag, a briefcase or the like.

In another aspect of the invention, the at least one security condition comprises the permissibility of a fusion of the specific person with another person, in particular wherein a fusion of a cleared person with another person is permissible only if the other person is also a cleared person. This way, an intruder cannot gain access through the door by hiding behind a cleared person. This security condition is also met if no fusion has taken place.

In order to communicate with the at least one person in front of the door, the door system and/or the building in which the door system is installed may comprise a signaling device, in particular an optical and/or acoustical signaling device, wherein the signaling device is activated by the tracking unit and/or the control unit if a person intends to pass the door when the clearing status of the person is negative and/or, optionally, if at least one security condition has not been met.

In an embodiment, the door comprises at least one door leaf actuated by the drive unit, wherein when the drive unit is controlled to open the door, the door leaf is moved to open the door forming a passage of such a width that only the specific person approaching the door is able to pass the door achieving a reliable separation of persons.

To further increase the reliability of the separation, the door may comprise at least two door leafs and two drive units for actuating the door leafs independently from one another, wherein, when the drive units are controlled to open the door, the drive units actuate the door leafs such that the door opens at a position along the passageway of the door right in front of the cleared person approaching the door, in particular wherein the door leafs are movable beyond the middle of the passageway of the door.

In another embodiment, at least one primary door system and at least one secondary door system are provided, wherein the secondary door system and the terminal are arranged on opposite sides of the primary door system, wherein the method comprises the following further steps:

- capturing a recording by the camera of the secondary door system and transmitting the recording to the tracking unit, wherein the at least one person present in the recording of the primary door system is present in the recording of the secondary door system, in particular after having passed the door of the primary door system,
- tracking the movement of the at least one person in the recording of the secondary door system by the tracking unit, and
- controlling the drive unit of the secondary door system based on the movement of the at least one person and its clearing status, in particular wherein the primary door system is associated with or comprises a primary tracking unit for tracking the at least one person in the recording captured by the primary door system and the secondary door system is associated with or comprises a secondary tracking unit for tracking the at least one person in the recording captured by the secondary door system, wherein the primary tracking unit transmits the clearing status of the at least one person to the secondary tracking unit.

By providing a secondary door system, the possibility that an intruder gains access is virtually eliminated as an intruder will have to pass the primary door system and also the secondary door system.

For example, the field of view of the camera of the secondary door system does not include the terminal and possibly not the door of the primary door system.

In order to allow tree-like access structures and/or sophisticated access schemes for different parts of a building, at least two secondary door systems may be provided, wherein the doors of the secondary door systems are directly accessible from the primary door system, in particular wherein the clearing status of the at least one person also depends on the specific secondary door system. In particular, the clearing status of a person may be different for different doors systems.

Within this disclosure, directly accessible means that a person starting from one secondary door system does not have to pass a door of another secondary door system to reach the door of the primary door system.

For a real-time and reliable determination and evaluation, the tracking of the at least one person in the recording, the determination of a property of the person in the recording, the determination if the at least one property of the input data and the at least one determined property match, the determination whether and/or which security condition is met or not met, the determination whether, how wide and/or where the door shall be opened may be performed by a deterministic algorithm, a machine learning algorithm, a support vector machine and/or a trained artificial neural network of the tracking unit.

In particular wherein the artificial neural network is trained using training data, wherein the training data comprises, for various training situations, input data of the same type and structure as the data which is fed to the artificial neural network during regular operation of the person separation device, and information about the expected correct output of the artificial neural network for the training situations; the training comprises the following training steps:

- feed forward of the input data through the artificial neural network;
- determining an answer output by the artificial neural network based on the input data,
- determining an error between the answer output of the artificial neural network and the expected correct output of the artificial neural network;

and

- changing the weights of the artificial neural network by back-propagating the error through the artificial neural network.

In particular the input data includes recordings generated by the camera, at least one property of the person in the recording and/or the result of the clearing process; wherein the information about the expected correct output includes the actual movement of the person in the recording, the actual property of the person in the recording, a determination if the at least one property of the input data and the at least one determined property match, a determination whether and/or which security condition is met or not met and/or a determination whether, when, how wide and/or where the door shall be opened; and wherein the answer output includes the determined movement of the person in the recording, the determined property of the person in the recording, a determination if the at least one property of the input data and the at least one determined property match, a determination whether and/or which security condition is met or not met and/or a determination whether, when, how wide and/or where the door shall be opened.

The recordings of the input data may be generated by the camera, meaning that the recording may have also been generated using a camera of an automatic door system of the same type, like a master system, and/or a camera in a lab that has the same or equivalent field of view.

For example, the result of the clearing process is transmitted to the tracking unit by a wireless connection, a cable-bound connection and/or using a light source of the terminal, the light source being included in the recording and the result being obtained by the tracking unit from the recording, achieving a reliable transmission of the result of the clearing process to the tracking unit.

For above mentioned purpose, further a person separation device is provided, comprising a clearing system with at least one clearing area, a tracking unit and at least one automatic door system. The automatic door system comprises a door, at least one drive unit for actuating the door, a camera and a control unit for controlling the drive unit, wherein the field of view of the camera includes the clearing area. The person separation device is configured to carry out a method as explained above, in particular wherein the tracking unit is part of the door system, for example the control unit.

The features and advantages discussed in context of the method also apply to the person separation device and vice versa.

The clearing system may comprise a terminal located in the clearing area.

The clearing system is configured to determine if a certain person is allowed to enter the zone behind the automated door.

In an embodiment, the person separation device comprises at least one primary door system and at least one secondary door system, in particular wherein the primary door system is associated with or comprises a primary tracking unit for tracking the at least one person in the recording captured by the primary door system and the secondary door system is associated with or comprises a secondary tracking unit for tracking the at least one person in the recording captured by the secondary door system.

BRIEF DESCRIPTION OF THE DRAWINGS

Further features and advantages will be apparent from the following description as well as the accompanying drawings, to which reference is made. In the drawings FIGS. 3*a-f*: show the person separation device of FIG. 1 operating according the method according to the invention in a first situation at different points in time, FIGS. 5*a-d*: show the person separation device of FIG. 1 operating according the method according to the invention in a second situation at different points in time, FIGS. 6*a-b*: show the person separation device of FIG. 1 operating according the method according to the invention in a third situation at different points in time, FIGS. 9*a-b*: show the person separation device of FIG. 1 operating according the method according to the invention in a sixth situation at different points in time, FIG. 10: shows schematically a person separation device according to a second embodiment of the invention, and FIG. 11: shows schematically a person separation device according to a third embodiment of the invention.

DETAILED DESCRIPTION OF THE DRAWINGS

Figure 1:
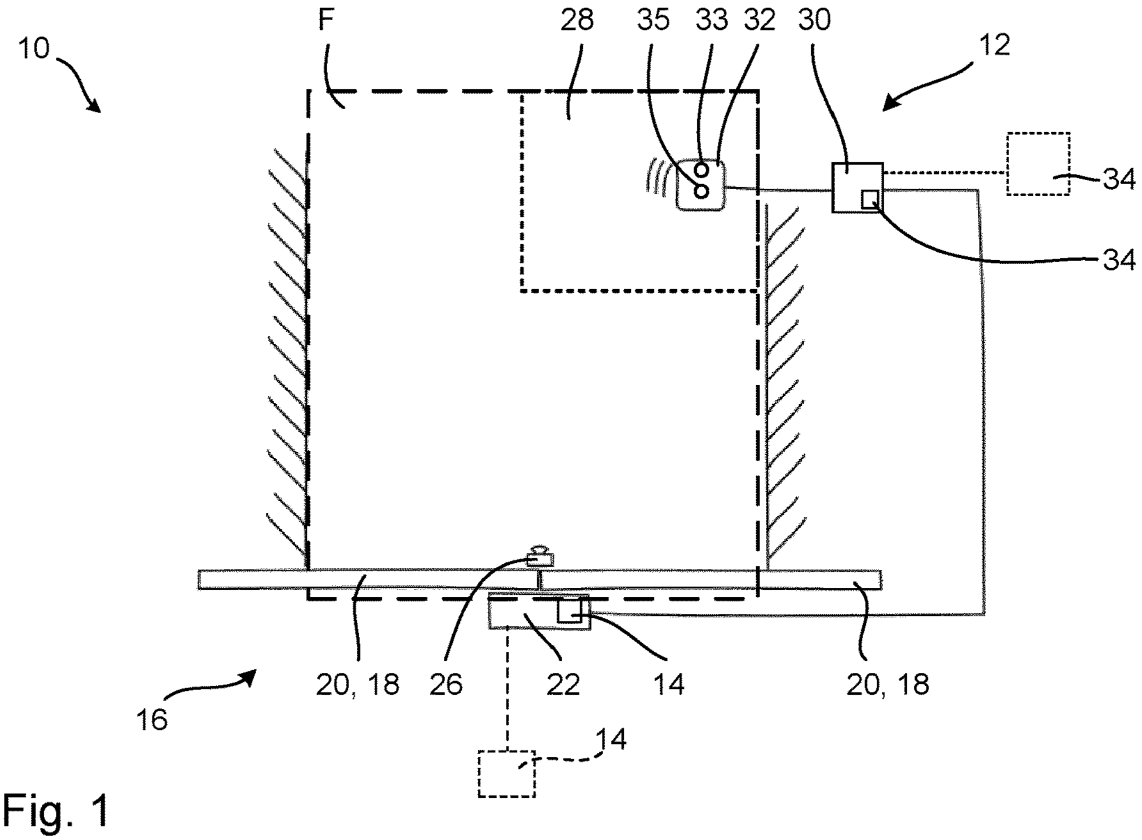
FIG. 1: shows a person separation device according to the invention in a schematic top view.

FIG. 1 shows very schematically in a top view a person separation device 10 having a clearing system 12, a tracking unit 14 and an automatic door system 16.

Figure 2:
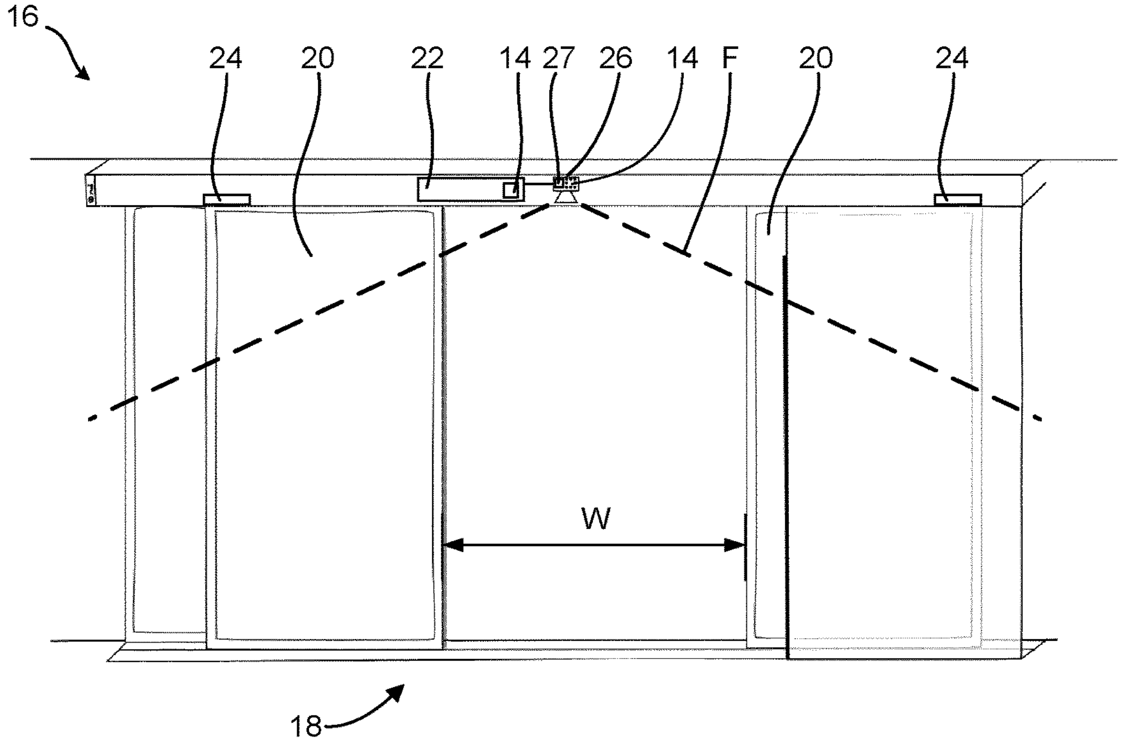
FIG. 2: shows the automatic door system of the person separation device of FIG. 1 schematically.

The automatic door system 16 is shown in more detail in FIG. 2. The automatic door system 16 has a door 18, being a sliding door in the shown embodiment with two door leafs 20, a control unit 22, two drive units 24 and a camera 26.

The door 18 may as well be a swing door, a revolving door, a folding door or the like. The method of operation remains the same.

The camera 26 and the drive units 24 are connected to the control unit 22, wherein the control unit 22 is configured to control the drive units 24.

Each of the drive units 24 is associated with one of the door leafs 20 and is designed to move the respective door leaf 20 along a track. The door leafs 20 may be moved individually from one another.

In particular, the door leafs 20 are moveable such that between them a passage for person can be opened, wherein the width W of the passage is adjustable by the control unit 22.

The camera 26 has a controller 27 and is located above the door 18, i.e. above the track of the door leafs 20.

The camera 26 is an integral part of the safety functionality of the door system 16. Namely, the camera 26 monitors the track of the door 18, i.e. the movement path of the door leafs 20, and forwards this information to the control unit 22 or its integrated controller 27. Based on this information, the integrated controller 27 and/or the control unit 22 control the drive units 24 to ensure that the door 18 is operated safely. In particular, to avoid that persons, in particular children, present in the track of the door 18 are harmed by the door leafs 20.

The tracking unit 14 may also be a part of the automatic door system 16. For example, the tracking unit 14 may be integrated into the control unit 22 or integrated into the controller 27 of the camera 26. A tracking unit 14 as part of the camera 26 is indicated with dotted lines in FIG. 2.

It is also conceivable that the tracking unit 14 is separate from the door system 16. In this case, the tracking unit 14 may be provided as a server (shown in dashed lines in FIG. 1), for example a cloud server or a server on premise.

In any case, the tracking unit 14 is connected to the clearing system 12 as well as the control unit 22 and/or the drive units 24.

Turning back to FIG. 1, the clearing system 12 comprises a clearing area 28, an evaluation unit 30 and, in the shown embodiment, a terminal 32.

The clearing area 28 is an area in front of the door 18 in which persons who desire to pass the door will have to perform a clearing action.

The terminal 32 is located within the clearing area 28. This includes cases, in which persons in the clearing area 28 may interact with the terminal 32 just outside the clearing area.

The terminal 32 is depicted as an authentication terminal or a payment device in the shown embodiment.

In case of an authentication terminal as the terminal 32, the person separation device 10 may be located in the entrance area of a building controlling the access of people to a restricted area of the building to authorized persons.

In case of a payment device as the terminal 32, the person separation device 10 may be located at the exit of a supermarket or a retail store to ensure that only persons that have paid their purchases may leave the shop.

It is also possible that the terminal 32 is a hygiene device, for example a dispenser for disinfectant, a sink, a decontamination device or the like. In these cases, the person separation device 10 may restrict the access to and/or from an area with specific hygiene standards, for example a ward at a hospital, a laboratory, a clean room or the like.

The terminal 32 may also be a detection device, for example for detecting radioactivity or detecting applied sunscreen, or an interaction device with a display, for example a display for automatically replaying a video with safety instructions. The separation device 10 may allow access only if the measurement of the detection device is normal, e.g. above or below a predetermined threshold, or if the interaction with the display has been performed successfully, e.g. the instruction video has been watched until the end.

The terminal 32 is connected to the evaluation unit 30, which receives input from the terminal 32.

The evaluation unit 30 has access to a database 34, either by a network connection to a server in a local network or the Internet, or because the database 34 is part of the evaluation unit 30.

The evaluation unit 30 is in turn connected to the tracking unit 14. This connection may be a cable-bound connection or a wireless connection.

FIGS. 3*a-f* show the method of operation according to the invention of the person separation device 10 wherein the person separation device 10 is shown in different points in time during the method. FIG. 4 shows a flowchart of the method according to the invention.

Figure 3A:
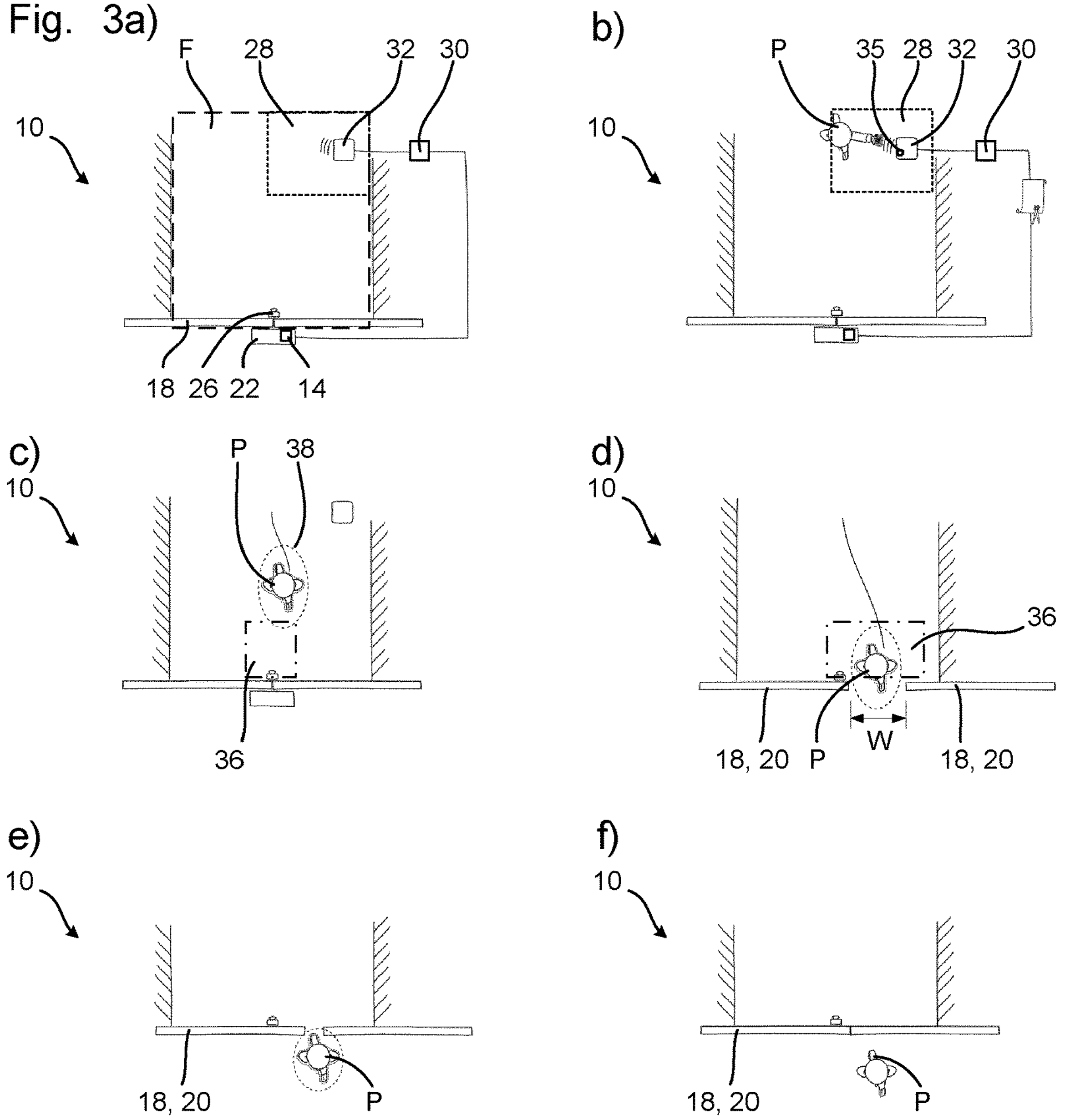
Figure 4:
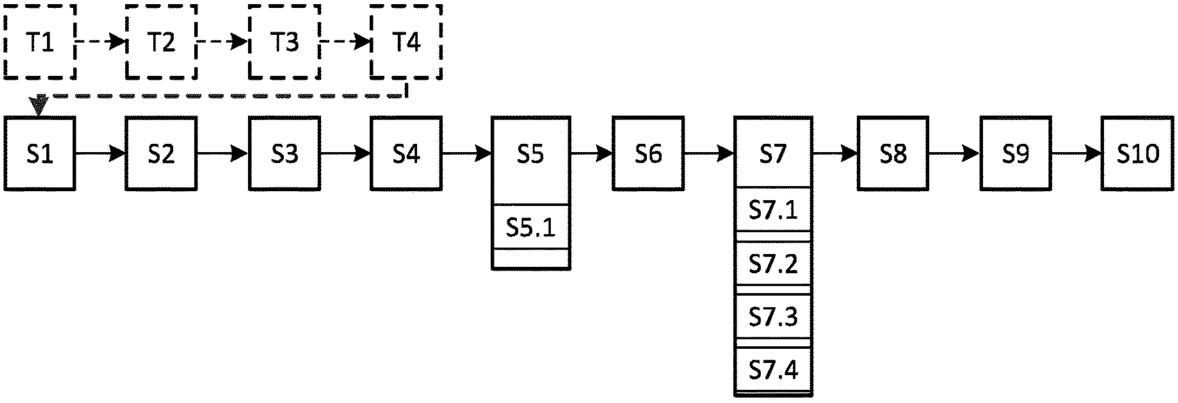
FIG. 4: shows a flowchart of the method according to the invention.
Figure 5A:
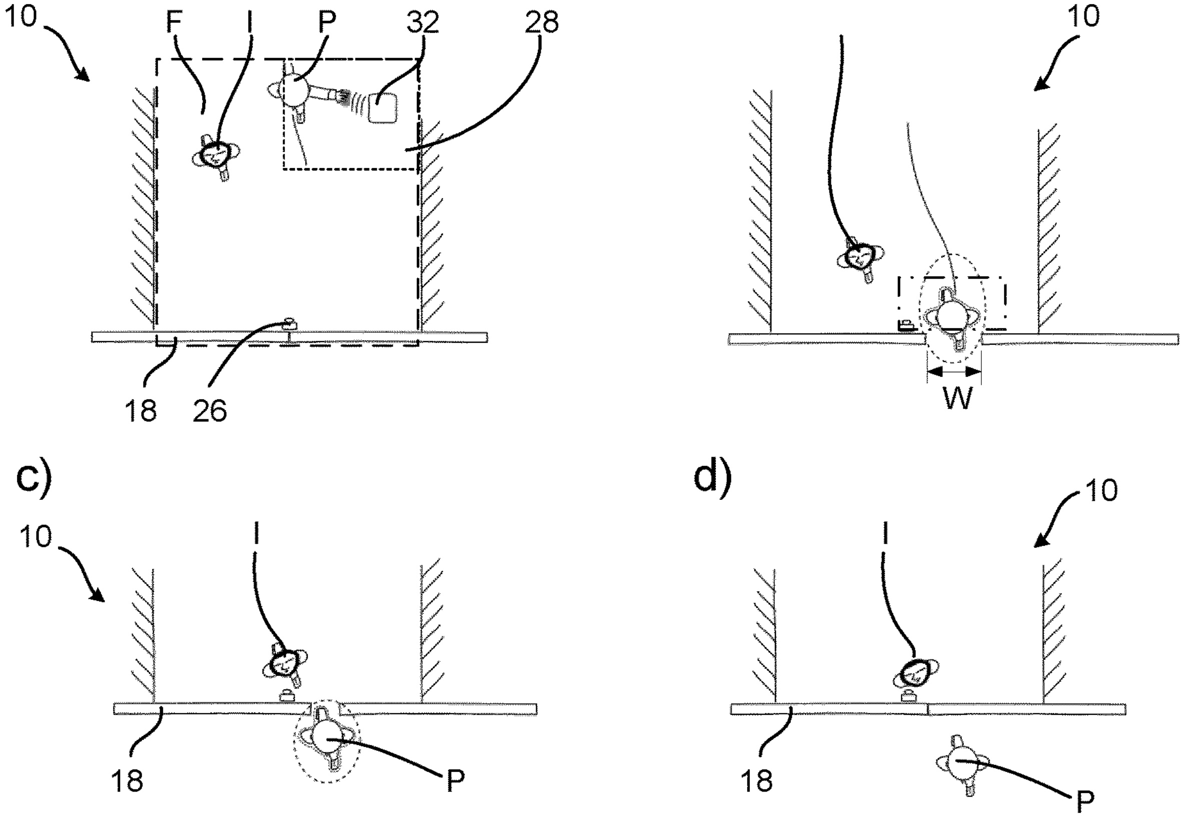

FIG. 3*a* corresponds to FIG. 2. No person is approaching the door 18.

Nevertheless, in step S1, the camera 26 captures a recording that includes the field of view F of the camera 26.

The field of view F is shown in FIGS. 2 and 3*a* as a dashed line. The field of view F includes the clearing area 28, and thus the terminal 32 (if present), as well as of the track of the door 18, in particular the track of the door leafs 20.

Thus, the area between the terminal 32 and/or the clearing area 28 and the door 18 is also included in the recording.

The field of view of the camera 26 may cover an area of up to 5 m, preferably up to 7 m, more preferably still up to 10 m in front of the door 18, measured on the ground.

The recording is, for example, a recording of a series of consecutive images and/or a video recording.

In FIG. 3*b*, a person P that wishes to pass the door 18 enters the field of view F and the clearing area 28. Thus, the person P is captured in the recording.

The recording is transmitted to the tracking unit 14, in particular continuously, and the tracking unit determines in step S2 that a person is present in the recording, more precisely in the clearing area 28. From this point on, the tracking unit 14 tracks the movement of the person P over time.

The person P performs a clearing action in the clearing area 28. In the shown embodiment the clearing action involves interaction with the terminal 32.

In case of an authentication terminal as the terminal 32, the person P may present his/her identification badge to the terminal 32 which is then read by the terminal 32 and/or interact with a biometric sensor 33 of the terminal 32, e.g. a fingerprint sensor, an iris scanner or the like.

In case of a payment device as the terminal 32, the person P may perform a payment as the clearing action on the terminal 32.

In case of hygiene devices as terminals 32, the proper use of the hygiene device is the clearing action.

It is also possible that the clearing action does not involve interaction with a terminal 32, for example if a payment is made via the person's mobile device.

In any case, in step S3 the evaluation unit 30 performs a clearing process. To do so, the evaluation unit 30 evaluates the clearing action and determines if the clearing action conforms to a predetermined criterion that indicates whether or not the respective person P shall be allowed to pass the door 18 based on the clearing action.

For example, the evaluation unit 30 determines based on the data received from the identification badge and based on the information in the database 34 whether or not the person P is authorized to pass the area behind the door 18.

Likewise, the evaluation unit 30 may verify the payment and whether the payment reaches the amount necessary to exit through the door 18, e.g. the amount of the value of the goods purchased in the shop.

If the evaluation by the evaluation unit 30 has been successful, e.g. the authentication and authorization of the person P is positive or the necessary amount has been fully paid, the evaluation unit determines that the clearing process is positive.

In step S4, the result of the clearing process is transmitted to the tracking unit 14.

The transmission of the result of the clearing process may be performed by the connection between the evaluation unit 30 and that tracking unit 14 as explained above.

The connection between the clearing system 12 and the tracking unit 14 may also be optical. In this case, the terminal 32 comprises a light source 35, which is located within the field of view F of the camera 26 and which lights up to indicate the result of the clearing process.

It is also possible that the tracking unit 14 receives from the clearing system 12, in particular the terminal 32 or the evaluation unit 30, further properties of the person P. The properties may be stored in the database 34 accessed by the evaluation unit 30 and/or included on the identification badge.

The property of the person P may be the age, the gender, the height and/or body movement patterns of the person P.

In step S5, the tracking unit 14 associates the recognized person P in the recording with the result of the clearing process received from the evaluation unit 30.

According to the result of the clearing process, the tracking unit 14 sets the clearing status of the person P accordingly. As the person P has just performed the clearing action in the clearing area 28, the tracking unit 14 can easily identify the person to which the results of the clearing process correspond.

Alternatively or in addition, the tracking unit 14 may determine the same properties of the person P in the recording which corresponds to the properties received from the clearing system 12.

The tracking unit 14 may then, in step S 5.1, compare the properties of the person P obtained from the recording with the properties received from the clearing system 12.

This comparison may be used to increase the accuracy of the association of the person P in the recording with clearing results received from the clearing system 12.

It may also or instead be used to further authenticate the person P, e.g. to verify that the identification badge presented to the terminal 32 belongs to the person P in the recording. This verification is referred to as a clearing condition in the following.

If the property received from the clearing system 12 and the property determine from the recording match, the clearing condition is met.

With the clearing condition met and a positive result from the clearing process, the tracking unit 14 sets the clearing status of the respective person P to a positive value.

If either the clearing condition is not met, i.e. the properties received from the clearing system 12 of the person P do not match with the properties of the person P determine from the recording, and/or the result of the clearing process is negative, the clearing status of the person P in the recording is set to negative by the tracking unit 14.

As can be seen in FIG. 3*c*, the person P proceeds from the clearing area 28 towards the door 18. The tracking unit 14 tracks the movement of the person P further (step S6).

Simultaneously, the tracking unit 14 evaluates whether or not the door 18 shall be opened and also various security conditions corresponding to the person P or general security conditions in step S7.

The security conditions discussed in the following may be monitored by them tracking unit 14 separately, in combination with any other security condition or not at all.

The first security condition is the integrity of a door-related security zone 36. The door-related security zone 36 is shown with the dashed dotted line in FIGS. 3*c* and 3*d* and its shape and size depend on kinematic properties of one, more or all uncleared person in the recording, in particular the walking speed, the walking direction and the distance to the door.

The area of the door-related security zone 36 in the recording corresponds to an area in front of the door 18, in particular directly adjoining the door 18. The door-related security zone does not have to cover the full width of the door 18, but the area in front of an opened passage of the door 18 is covered.

The shape, even though indicated as a rectangle in the drawings for the sake of clarity, may be any other shape, like an ellipse, circle or a shape of a probability distribution like a Gaussian distribution.

The shape and size of the door-related security zone 36 may depend on the width W of the passage, i.e. the opening width of the door 18. For example, if the width W increases, i.e. the door is opened further, the size of the door-related security zone 36 also increases.

The integrity of the door-related security zone 36 is given, meaning that the first security condition regarding the integrity of the door-related security zone 36 is met, if no uncleared person is present within the door-related security zone 36. An uncleared person is to be understood as a person not having a positive clearing status.

If an uncleared person is within the door-related security zone 36, also partially, the integrity of the door-related security zone 36 is now no longer given and the security condition concerning the integrity of the door-related security zone 36 is not met.

Thus, the tracking unit 14 determines from the recording, whether or not a person is present in the door-related security zone 36 and whether or not this person has a positive clearing status. Based on that, the tracking unit 14 determines in step S7.1 whether or not the first security condition concerning the door-related security zone 36 is met.

A second security condition concerns a dynamic, personal security zone 38, which is indicated with dashed lines in FIGS. 3*c, d* and *e*.

In contrast to the door-related security zone 36, which is static in place and varies optionally only in size and shape, the dynamic, personal security zone 38 is allocated to a person P in the recording and moves dynamically with this person.

The dynamic, personal security zone 38 is an area in the recording, and thus in real life, around a person, in particular a person having a positive clearing status.

The dynamic security zone 38 has a predefined shape and size around the respective person but moves with the movement of the respective person in the same manner.

As explained with respect to the door-related security zone 36, also the shape and/or the size of the dynamic security zone 38 may depend on the current width W of the open passage of the door 18.

For example, the shape and/or size of the door-related security zone 36 and/or the shape and/or size of the dynamic security zone 38 is always chosen such that the door 18 can be safely be closed between a cleared person passing the door 18 through the passage and an uncleared person trailing the cleared person just outside the respective security zone 36, 38.

Just like with the door-related security zone 36, the integrity of the dynamic security zone 38 is given and the second security condition is met if no uncleared person is within the dynamic security zone 38. If an unclear person is within the dynamic security zone 38, also partially, the integrity of the dynamic security zone 38 is not given and the second security condition is not met.

Thus, in step S7.2 the tracking unit 14 determines whether or not a person is within the dynamic security zone 38 of the person P approaching the door and determines whether or not the second security condition concerning the dynamic security zone 38 is met.

If more than one person P is present in the recording, each person P, at least each cleared person P, is allocated a separate personal dynamic security zone 38. Thus, more than one security zone 38 may exist.

In the situation shown in FIG. 3*c*, no other person is within the door-related security zone 36 and the dynamic security zone 38 so that the tracking unit 14 determines in step S7 that the security conditions are met.

Then, the tracking unit 14 determines in step S8 that the door 18 shall be opened for the person P as the person P approaches the door 18, has a positive clearing status and the security conditions are met.

Further, the tracking unit 14 determines where, when and how wide the door 18 shall be opened, i.e. where the passage for the person P shall be created and what width W the passage should have. To this end, the position of the person P in the recording with respect to the door 18 is be evaluated by the tracking unit 14.

On the other hand, if the person P has no positive clearing status or any of the security conditions are not met, the tracking unit 14 will determined that the door 18 shall be kept close.

In step S9, the tracking unit 14 transmits to the control unit 22 that the door 18 shall be opened, the desired opening width, i.e. the width W of the passage, as well as the location along the track of the door 18 where the passage shall be created.

The control unit 22 controls then, in turn, one or both of the drive units 24 to move the door leafs 20 to achieve the desired passage of the door 18. As can be seen in FIG. 3*d*, the passage has been created right in front of the person P and the person P can walk right through it without changing its pace or direction.

Alternatively, the tracking unit 14 may control the drive units 24 directly.

The location at which the passage shall be formed is a position along the passageway of the door 18, i.e. the track of the door leafs 20. To achieve this, the door leafs 20 may be driven independently from one another and may move even beyond the middle of the passageway of the door. In other words, the door leafs 20 may even move further inwards than in the regularly closed position of the door 18.

In step S10, the tracking unit 14 and/or the control unit 22 determines from the recording that the person P has passed through the door 18. In response, the tracking unit 14 and/or the control unit 22 controls the drive units 24 to actuate the door leafs 20 to close the door 18 right behind the person P (see FIGS. 3*e* and *f*).

The closing of the door 18 may be performed by the control unit 22 and/or the controller 27 of the camera 26 as part of the integrated safety functionality of the door 18.

FIGS. 5*a* to 5*d* show a second situation that may occur during the operation of the person separation device 10 according to the method of the invention.

In contrary to the situation discussed before, besides the person P, which is allowed to pass the door 18, a second person is present in the field of view F of the camera 26 and thus in the recording.

In the following, the other person is called intruder I only for the sake of the discussion but may of course be another customer of the shop that has not yet paid or the like.

Thus, in the recording, two persons, namely person P and intruder I are present.

The tracking unit 14 recognizes the two persons as separate persons. For each person, the tracking unit 14 sets a clearing status, may recognize properties and tracks its movements over time. Steps S2 to S5 are therefore carried out for each person. In other words, each person in the recording has an individual clearing status and its movements are tracked by the tracking unit 14 separately.

Thus, person P, after having performed the clearing action, will receive a positive clearing status from the tracking unit 14. In the contrary, the intruder I has not performed a clearing action, at least not one that has led to a positive result of the clearing process, so that the tracking unit 14 sets the clearing status of the intruder I to a negative status. The intruder I is thus an uncleared person.

The movement of the cleared person P is the same as in the situation of FIG. 3. The intruder I also approaches the door, but at a slower pace and with a rather large distance to the cleared person P.

Thus, the intruder I does not violate the dynamic security zone 38 as he has a sufficient distance to the person P.

In addition, the person P reaches the door 18 much sooner than the intruder I so that the intruder I stays clear of the door-related security zone 36 at the time the door shall be open.

Thus, the security conditions are met, the person P has a positive clearing status and approaches the door, so that the tracking unit 14 determines that the door 18 shall be opened. The tracking unit 14 then controls the control unit 22 as explained above, to initiate that the door 18 is opened and the person P passes the door (FIG. 5*b*).

As can be seen in FIGS. 5*c* and 5*d*, as the door 18 closes right behind the person P, thus right after the person P has passed the passageway of the door 18, the intruder I cannot pass the door 18 as it is closed already.

Further, the door 18 will not open for him, as the intruder I has not a positive clearing status.

In consequence, the cleared person P has been successfully separated from the uncleared person I.

Figure 6A:
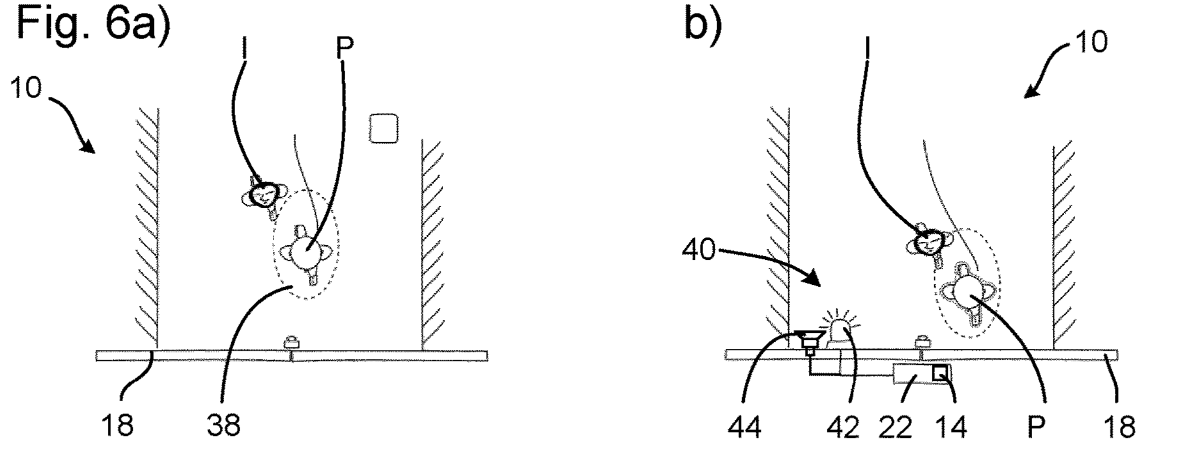

FIGS. 6*a* and 6*b* show a slightly different situation from that of FIG. 5. In this situation, the intruder I follows the cleared person P very closely and violates the integrity of the dynamic security zone 38 of the cleared person P.

The tracking unit 14 thus determines in step S 7.2 that the integrity of the dynamic security zone 38 is not given so that the second security condition concerning the dynamic security zone 38 is not met.

As one security condition is not met, the door 18 cannot be opened as the intruder I could also pass the passageway of the door 18. Therefore, for the cleared person P to pass the door 18, the intruder has to back up.

Thus, the tracking unit 14 controls the control unit 22 in step S9 to keep the door 18 closed. The control unit 22 may control the drive unit 24 accordingly, if necessary.

In addition, the control unit 22 and/or the tracking unit 14 may control a signaling device 40 to indicate that an intruder I has intended to pass the door 18 and thus that the door could not be opened.

The signaling device 40 may be an optical signaling device 42, like a light source, and/or an acoustical signaling device 44, like a speaker.

The signaling device 40 may be part of the person separation device 10, the automatic door system 16 or of the building that the door system 16 is installed in.

Figure 7:
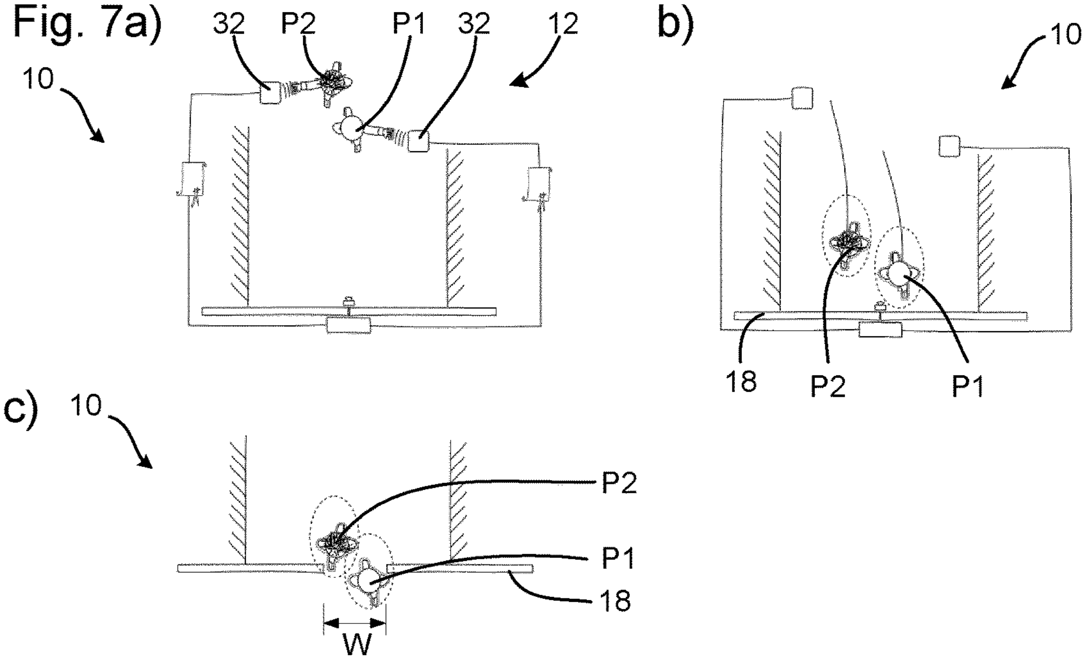
FIGS. 7*a-c*: show the person separation device of FIG. 1 operating according the method according to the invention in a fourth situation at different points in time.

FIGS. 7*a* to *c* show a third situation during the operation of the person separation device 10 according to a method of the invention.

In this situation, the person separation device 10, more precisely the clearing system 12, comprises two terminals 32.

The terminals 32 may be within the same clearing area 28 or two separate clearing areas 28 may be part of the clearing system 12.

In the shown situation, to persons P1, P2 would like to pass the door 18 and perform clearing actions at either one of the terminals 32.

As explained before, the tracking unit 14 recognizes each person P1, P2 in the recording as a separate person, and receives the result of the clearing processes of the clearing system 12 for each of the persons P1, P2.

As the clearing processes have been performed on different terminals 32 and/or indifferent clearing areas 28 (and the result of the clearing process includes information about the terminal at which the clearing action has been performed), the tracking unit 14 may associate the result of the clearing process of each of the persons P1, P2 with the correct person P1, P2 in the recording. Further, the properties of the persons P1, P2 may also be matched (step S5.1).

Both of the clearing processes have been positive and the clearing condition has also been met so that the tracking unit 14 sets the clearing status of both persons P1, P2 to a positive value meaning that both of them are cleared.

As can be seen in FIG. 7*b*, person P1 and person P2 approach the door 18 almost simultaneously. As both persons P1, P2 are cleared, the tracking unit 14 determines that the door shall be opened, even though the persons P1, P2 may be within the dynamic security zone 38 of one another, as seen in FIG. 7*c*.

Thus, the tracking unit 14 initiates the opening of the door 18 with a width W that creates a passage allowing both persons P1, P2 to pass the door 18 simultaneous and in particular without changing their pace.

FIGS. 8*a* to 8*d* show yet another situation of the person separation device 10 during operation according to the method of the invention.

Figure 8:
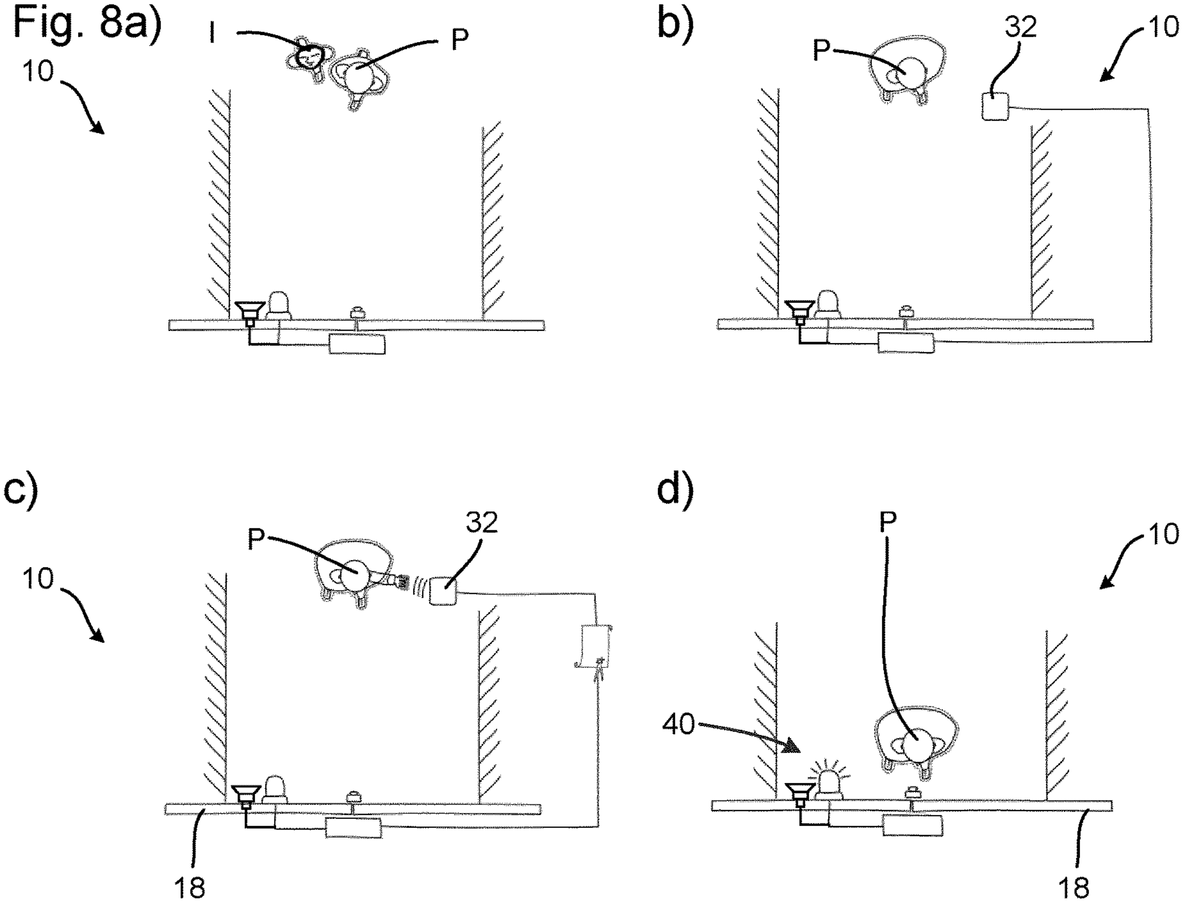
FIGS. 8*a-d*: show the person separation device of FIG. 1 operating according the method according to the invention in a fifth situation at different points in time.

As seen in FIG. 8*a*, again a person P which is allowed to pass the door 18 and the intruder I approach the door simultaneously and are in the field of view F of the camera 26.

Thus, the tracking unit 14 recognizes the person P and the intruder I as separate persons in the recording.

In this situation, a third security condition is used. This third security condition concerns the fusion of persons.

In the sense of the invention, a fusion of persons describes the process when, at first, two distinct and separate persons are recognized by the tracking unit 14 close together, and at a later point in time, only one person is recognizable in the recording without the other person having left the field of view F through its boundaries.

The third security condition concerning the fusion of persons is met, if no fusion or a fusion of a cleared person with another cleared person is recognized. In any other case, i.e. the fusion of a cleared person with an unclear person or the fusion of two uncleared persons results in the third security condition concerning the fusion of persons not being met.

In FIG. 8*a*, an intruder I and a person P are close together. Then, in FIG. 8*b*, only the cleared person P is left and is a part of the recording. This may happen if, for example, the intruder I hides behind the person P or has been covered by its coat to smuggle the intruder I through the door 18.

In FIG. 8*c*, the person P performs the clearing action at the terminal 32 which does result in a positive result of the clearing process.

The person P then approaches the door 18 (FIG. 8*d*) and—as no intruder I is present in the recording—the first and second security conditions regarding the static and dynamic security zone 36, 38 are met.

However, as the tracking unit determines in step S7.3 that a fusion of an unclear person I and a cleared person P has taken place, the third security condition concerning the fusion of persons has not been met.

Thus, the tracking unit 14 informs the control unit 22 that the door 18 shall be closed or kept closed and activates the signaling devices 40.

FIGS. 9*a* and 9*b* show another situation during the operation of the person separation device 10 according to a method of the invention.

In this situation, an inanimate object 46, for example a briefcase or a bag, is present in front of the door 18 in the field of view F of the camera 26.

The tracking unit 14 recognizes the object 46 in the recording as a single, isolated object.

As indicated in FIG. 9*a*, a cleared person P approaches the object 46 and picks it up so that the object 46 and the cleared person P fuse to one object.

Thus, fusion of the inanimate object with the person P has been taken place, as the object 46 and the person P are no longer discernible from one another in the recording and have to be treated as a single object or person, respectively.

For these situations, a fourth security condition concerning the fusion of persons with objects is used and evaluated in step S7.4.

In the shown situation in FIG. 9*b*, the fusion of a cleared person P with an inanimate, previously isolated object is permissible so that the fourth security condition is met. The tracking unit 14 thus controls the control unit 22 to open the door 18 for the person P carrying the object 46.

However, more sophisticated versions of this fourth security condition regarding the fusion of objects and persons are conceivable.

For example, the object 46 may be classified concerning its type. The fourth security condition may only allow the fusion of specific types of objects with cleared persons. Thus, the fusion of an object of an unallowed type even with a cleared person P may lead to the fourth security condition not being met.

In order for the tracking unit 14 to perform all or any of the above mentioned determinations, the tracking unit 14 comprises a deterministic algorithm, a machine learning algorithm, a support vector machine and/or a trained artificial neural network.

The artificial neural network of the tracking unit 14 is an artificial neural network trained using training data.

The training data comprises sets of different input data for various situations, for example situations as explained above, and also information about whether, when, where and how wide the door shall be opened in each of the situation.

The input data includes the same type and data structure as supplied to the artificial neural network during the operation of the artificial neural network as explained above.

In particular, the input data includes recordings generated by the camera 26, at least one property of the person P in the recording and/or the result of a clearing process.

Further, the input data includes the expected correct output of the artificial neural network in response to each data set of the input data, in particular information about the actual movement of the person in the recording, the actual property of the person in the recording, a determination if the at least one property of the input data and the at least one determined property match, a determination whether and/or which security condition is met or not met, a determination whether, when, how wide and/or where the door shall be opened.

For the training of the artificial neural network, in a first training step T1 (FIG. 4) the input data is fed forward through the artificial neural network. Then, the answer output of the artificial neural network is determined (step T2).

The answer output may include the determined movement of the person in the recording, the determined property of the person in the recording, a determination if the at least one property of the input data and the at least one determined property match, a determination whether and/or which security condition is met or not met, a determination whether, when, how wide and/or where the door shall be opened that has/have been determined by the artificial neural network based on the input data for one of the various training situations.

In step T3, an error between the answer output of the artificial neural network and the expected correct output (known from the training data) is determined, in particular an error between the determined and the correct movement of the person in the recording, between the determined and correct property of the person in the recording, between the determined and correct determination if the at least one property of the input data and the at least one determined property match, between the determined and correct determination whether and/or which security condition is met or not met, and/or between the determined and correct determination whether, when, how wide and/or where the door shall be opened.

In step T4, the weights of the artificial neural network are changed by back propagating the error through the artificial neural network.

FIGS. 10 and 11 show a second and third embodiment of the person separation device 10 according to the invention. The second or third embodiment correspond substantially to the first embodiment so that only the differences are discussed in the following. The same and functionally the same components are labeled with the same reference numbers.

In the embodiment of FIG. 10, the person separation device 10 comprises two automatic door systems with a door 18 each that are arranged in a serial fashion, i.e. one behind the other.

The automatic door system 16 closest to the clearing area 28 is called primary door system 16 in the following. The primary door system 16, the clearing system 12 and the tracking unit 14 correspond to the first embodiment of the person separation device 10 as discussed above.

The second automatic door system, secondary door system 48 in the following, has the same components as the primary automatic door system 16, in particular also a camera 26.

In other words, the clearing area 28 and the secondary door system 48, in particular its door 18, are on opposite sides of the primary door system 16.

Further, two tracking units 14 are provided, namely a primary tracking unit 14 associated with the primary door system 16 and a secondary tracking unit 14 associated with the secondary door system 48.

The field of view F2 of the camera 26 of the secondary door system 48 does not necessarily include the clearing area 28. Further, the field of view F2 of the secondary door system 48 may or may not include the door 18 of the primary door system 16.

Nevertheless, a person P having passed the primary door system 16 is either immediately within the field of view F2 of the secondary door system 48 or enters the field of view F2 at a later point in time.

The secondary tracking unit 14 associated with the secondary door system 48 is connected to the primary tracking unit 14 associated with the primary door system 16 and/or the clearing system 12.

In particular, the secondary tracking unit 14 determines the clearing status of the person P in the field of view F2 of the camera 26 of the secondary door system 48 in much the same way as the primary tracking unit 14 does.

For example, the secondary tracking unit 14 receives from the primary tracking unit 14 the clearing status of the person P passing the door 18 so that the secondary tracking unit may associate the clearing status received from the other tracking unit 14 easily with the person P recognized in the recording captured by camera 26 of the secondary door system 48.

The secondary tracking unit 14 tracks the movement of the one or more persons P in the recording of the respective camera 26 of the secondary door system 48 and controls the control unit 22 and/or the drive unit 24 of the secondary door system 48 based on the evaluation of the movement, the clearing status of the person and optionally further security conditions.

The manner in which it is determined whether, where and how wide the door 18 of the secondary door system 48 shall be opened is done in the same way as for the primary door system 16, i.e. as explained with respect to the first embodiment.

If the field of view F2 of the secondary door system 48 does not include the door 18 of the primary door system 16, the association of the person P in the recording with the respective clearing status may be done based on the properties of the person P as explained with respect to step 5.1.

Thus, by having two doors 18 behind one another, the efficiency of the person separation device 10 may be increased drastically, as it is much more difficult for an intruder I to pass through both doors 18.

In fact, another security condition may be introduced for the secondary door system 48. For example, the door 18 of the secondary door system 48 may only be opened if no uncleared person has passed the door 18 of the primary door system 16.

The embodiment according to FIG. 11 also comprises a primary door system 16 but, in contrast to the second embodiment according to FIG. 10, two secondary door systems 48.

The doors 18 of both of the secondary door systems 16 are directly accessible from the door 18 of the primary door system 16 meaning that a person starting from the door 18 of the primary door system 16 can reach either of the doors 18 of the secondary door systems 48 without passing through the door 18 of the other one of the secondary door systems 48.

In other words, after person P has passed the door 18 of the primary door system 16, he can choose between two doors 18 of the secondary door system 48.

In addition to the functions of the secondary tracking units 14 corresponding to the secondary door systems 48, it is possible that the clearing status of a person P for the secondary tracking units 14 depends on the specific secondary door system 48. Thus, even though one of the secondary tracking units 14 assigns a positive clearing status to a person P due to its authorization, another secondary tracking unit 14 associated with another secondary door system 48 may assign a negative clearing status as a specific person P might not be authorized to access the area behind this specific secondary door system 48.

The invention claimed is:

1. A method for operating a person separation device comprising a clearing system with at least one clearing area, a tracking unit and at least one automatic door system, the automatic door system comprising a door, at least one drive unit for actuating the door, a camera and a control unit for controlling the drive unit, wherein the field of view of the camera includes the clearing area, wherein the method comprises the following steps:

capturing a recording by the camera and transmitting the recording to the tracking unit, wherein at least one person (P) is present in the recording, receiving, by the tracking unit from the clearing system, the result of a clearing process of the at least one person (P) in the clearing area, setting a clearing status of the at least one person (P) based on the result of the clearing process of the respective at least one person (P) by the tracking unit, tracking the movement of the at least one person (P) in the recording after the clearing process by the tracking unit, and controlling the drive unit based on the movement of the at least one person and the clearing status wherein the drive unit is controlled the door for a specific person if the specific person approaches the door, the clearing status of the specific person is positive and at least one security condition is met, or wherein the door is kept close or the drive unit is controlled to close the door if the specific person approaches the door but the clearing status of the specific person is negative or at least one security condition is not met, wherein the at least one security condition comprises the integrity of a door-related security zone the door-related security zone being an area in the recording, wherein the shape and/or size of the door-related security zone depends on kinematic properties of an uncleared person, including one or more of a walking speed of the uncleared person, a walking direction of the uncleared person and a distance of the uncleared person to the door, wherein the security condition regarding the integrity of the door-related security zone is met if no uncleared person is within the door-related security zone.

2. The method according to claim 1, characterized in that the clearing status of a person (P) in the recording is positive if the tracking unit has received a positive result of the clearing process of the respective person (P) and, if at least one clearing condition has been met; or wherein the clearing status of a person (P) in the recording is negative if the tracking unit has not received a positive result of the clearing process of the respective person (P) or if at least one clearing condition has not been met.

3. The method according to claim 1, characterized in that the clearing process includes detecting a clearing action performed by the at least one person (P) in the clearing area, and evaluating the performed clearing action by the clearing system, wherein the result of the clearing process is positive if the clearing action conforms to at least one predetermined criterion.

4. The method according to claim 3, characterized in that the clearing system comprises at least one terminal located in the clearing area (28), wherein the clearing action is performed on the terminal (32).

5. The method according to claim 4, characterized in that the terminal is an authentication terminal or a payment device, wherein the clearing action is an authentication action or a payment, wherein the predetermined criterion for the clearing action is met if the clearing action has led to a successful authentication or authorization of the at least one person (P) or if the payment has been completed successfully.

6. The method according to claim 1, characterized in that the tracking unit receives information about at least one property of the person (P) from the terminal, and determines the same at least one property of the person (P) in the recording, wherein the clearing condition is met if the at least one property received from the clearing system and the at least one determined property match.

7. The method according to claim 1, characterized in that the at least one security condition comprises the integrity of a dynamic, personal security zone around the specific person (P), the personal security zone being an area with predefined shape and size in the recording around the specific person (P), wherein the security condition regarding the integrity of the dynamic security zone is met if no uncleared person is within the dynamic security zone.

8. A method for operating a person separation device comprising a clearing system with at least one clearing area, a tracking unit and at least one automatic door system, the automatic door system comprising a door, at least one drive unit for actuating the door, a camera and a control unit for controlling the drive unit, wherein the field of view of the camera includes the clearing area wherein the method comprises the following steps:

capturing a recording by the camera and transmitting the recording to the tracking unit, wherein at least one person is present in the recording, receiving, by the tracking unit from the cleaning system, the result of a clearing process of the at least one person in the clearing area, setting a clearing status of the at least one person based on the result of the clearing process of the respective at least one person by the tracking unit, tracking the movement of the at least one person in the recording after the cleaning process by the tracking unit, and controlling the drive unit based on the movement of the at least one person and the clearing status, wherein the drive unit is controlled to open the door for a specific person if the specific person approaches the door the clearing status of the specific person is positive and at least one security condition is met, or wherein the door is kept close or the drive unit is controlled to close the door if the specific person approaches the door but the clearing status of the specific person is negative or at least one security condition is not met, wherein the at least one security condition comprises the integrity of a door-related security zone, the door-related security zone being an area in the recording, wherein the shape and/or size of the door-related security zone depends on kinematic properties of an uncleared person including one or more of a walking speed, a walking direction of the uncleared person and a distance from the uncleared person to the door, wherein the security condition regarding the integrity of the door-related security zone is met if no uncleared person is within the door-related security zone, wherein the at least one security condition further comprises the integrity of a dynamic, personal security zone around the specific person, the personal security zone being an area with predefined shape and size in the recording around the specific person, wherein the security condition regarding the integrity of the dynamic security zone is met if no uncleared person is within the dynamic security zone, wherein the shape and/or size of the door-related security zone or the shape and/or size of the dynamic security zone is chosen such that the door can safely be closed between a cleared person (P) passing the door and an uncleared person (I) trailing the cleared person (P), and wherein the size of the door-related security zone or the size of the dynamic security zone depend on the current width of the opened passage of the door.

9. The method according to claim 1, characterized in that the at least one security condition comprises the permissibility of a fusion of the specific person (P) with a previous isolated object, wherein a fusion of a person (P) with a previously isolated inanimate object is permissible.

10. The method according to claim 1, characterized in that the at least one security condition comprises the permissibility of a fusion of the specific person (P) with another person, a fusion of a cleared person (P) with another person is permissible only if the other person is also a cleared person.

11. The method according to claim 1, characterized in that the door system or a building in which the door system is installed comprises a signaling device including an optical and/or acoustical signaling device, wherein the signaling device is activated by the tracking unit or the control unit if a person (I) intends to pass the door when the clearing status of the person (I) is negative or if at least one security condition has not been met.

12. The method according to claim 1, characterized in that the door comprises at least one door leaf actuated by the drive unit, wherein when the drive unit is controlled to open the door, the door leaf is moved to open the door forming a passage of such a width that only the specific person (P) approaching the door is able to pass the door.

13. The method according to claim 12, characterized in that the door comprises at least two door leafs and two drive units for actuating the door leafs independently from one another, wherein, when the drive units are controlled to open the door, the drive units actuate the door leafs such that the door opens at a position along the passageway of the door right in front of the specific person (P) approaching the door, wherein the door leafs are movable beyond the middle of the passageway of the door.

14. The method according to claim 4, characterized in that at least one primary door system and at least one secondary door system are provided, wherein the secondary door system and the terminal are arranged on opposite sides of the primary door system, wherein the method comprises the following further steps:

capturing a recording by the camera of the secondary door system and transmitting the recording to the tracking unit, wherein the at least one person (P) present in the recording of the primary door system is present in the recording of the secondary door system, in particular after having passed the door of the primary door system, tracking the movement of the at least one person (P) in the recording of the secondary door system by the tracking unit, and controlling the drive unit of the secondary door system based on the movement of the at least one person (P) and its clearing status, wherein the primary door system is associated with a primary tracking unit for tracking the at least one person (P) in the recording captured by the primary door system and the secondary door system is associated with a secondary tracking unit for tracking the at least one person (P) in the recording captured by the secondary door system, wherein the primary tracking unit transmits the clearing status of the at least one person (P) to the secondary tracking unit.

15. The method according to claim 14, characterized in that at least two secondary door systems are provided, wherein the doors of the secondary door systems are directly accessible from the primary door system, and wherein the clearing status of the at least one person (P) also depends on the specific secondary door system.

16. Method according to claim 1, characterized in that the tracking of the at least one person (P) in the recording, the determination of a property of the person (P) in the recording, the determination if the at least one property of the input data and the at least one determined property match, the determination whether or which security condition is met or not met, the determination whether, how wide or where the door shall be opened is performed by a deterministic algorithm, a machine learning algorithm, a support vector machine or a trained artificial neural network of the tracking unit, wherein the artificial neural network is trained using training data, wherein the training data comprises, for various training situations, input data of the same type and structure as the data which is fed to the artificial neural network during regular operation of the person separation device, and information about the expected correct output of the artificial neural network for the training situations; the training comprises the following training steps:

feed forward of the input data through the artificial neural network;

determining an answer output by the artificial neural network based on the input data, determining an error between the answer output of the artificial neural network and the expected correct output of the artificial neural network; and changing the weights of the artificial neural network by backpropagating the error through the artificial neural network, wherein the input data includes recordings generated by the camera, at least one property of the person (P) in the recording or the result of the clearing process; wherein the information about the expected correct output includes the actual movement of the person (P) in the recording, the actual property of the person (P) in the recording, a determination if the at least one property of the input data and the at least one determined property match, a determination whether or which security condition is met or not met or a determination whether, when, how wide or where the door (18) shall be opened; and wherein the answer output includes the determined movement of the person (P) in the recording, the determined property of the person (P) in the recording, a determination if the at least one property of the input data and the at least one determined property match, a determination whether or which security condition is met or not met or a determination whether, when, how wide or where the door shall be opened.

17. The method according to claim 1, characterized in that the result of the clearing process is transmitted to the tracking unit by a wireless connection, a cable-bound connection or using a light source of the terminal, the light source being included in the recording and the result being obtained by the tracking unit from the recording.

18. A person separation device comprising the clearing system with the at least one clearing area, the tracking unit and the at least one automatic door system, the automatic door system comprising the door, the at least one drive unit for actuating the door, the camera and the control unit for controlling the drive unit, wherein the field of view of the camera includes the clearing area, wherein the person separation device is configured to carry out the method according to claim 1, wherein the tracking unit is part of the control unit.

19. The person separation device according to claim 18, characterized in that the person separation device comprises at least one primary door system and at least one secondary door system, wherein the primary door system is associated with a primary tracking unit for tracking the at least one person (P) in the recording captured by the primary door system and the secondary door system is associated with a secondary tracking unit for tracking the at least one person (P) in the recording captured by the secondary door system.

* * * * *